No. 640,458. Patented Jan. 2, 1900.
F. S. FARR.
DOUBLE ACTING BAND SAW MILL.
(Application filed May 31, 1898.)
(No Model.) 8 Sheets—Sheet 1.

Witnesses.
C. F. Kilgore
G. D. Merchant

Inventor.
Freeman S. Farr.
By his Attorney.
Jas. F. Williams

No. 640,458. Patented Jan. 2, 1900.
F. S. FARR.
DOUBLE ACTING BAND SAW MILL.
(Application filed May 31, 1898.)
(No Model.) 8 Sheets—Sheet 6.

Fig. 6.

Witnesses.
C. F. Kilgore
F. P. Merchant

Inventor
Freeman S. Farr.
By his Attorney,
Jas. F. Williamson

No. 640,458. Patented Jan. 2, 1900.
F. S. FARR.
DOUBLE ACTING BAND SAW MILL.
(Application filed May 31, 1898.)

(No Model.) 8 Sheets—Sheet 7.

Witnesses.
C. F. Kilgore
F. D. Merchant

Inventor.
Freeman S. Farr.
By his Attorney,
Jas. F. Williamson

No. 640,458. Patented Jan. 2, 1900.
F. S. FARR.
DOUBLE ACTING BAND SAW MILL.
(Application filed May 31, 1898.)

(No Model.) 8 Sheets—Sheet 8.

Witnesses.
C. F. Kilgore
F. D. Merchant.

Inventor.
Freeman S. Farr.
By his Attorney.
Jas. F. Williamson.

UNITED STATES PATENT OFFICE.

FREEMAN S. FARR, OF MINNEAPOLIS, MINNESOTA, ASSIGNOR TO THE EDWARD P. ALLIS COMPANY, OF MILWAUKEE, WISCONSIN.

DOUBLE-ACTING BAND-SAW MILL.

SPECIFICATION forming part of Letters Patent No. 640,458, dated January 2, 1900.

Application filed May 31, 1898. Serial No. 682,136. (No model.)

*To all whom it may concern:*

Be it known that I, FREEMAN S. FARR, a citizen of the United States, residing at Minneapolis, in the county of Hennepin and State of Minnesota, have invented certain new and useful Improvements in Double-Acting Band-Saw Mills; and I do hereby declare the following to be a full, clear, and exact description of the invention, such as will enable others skilled in the art to which it appertains to make and use the same.

My invention relates to sawmills.

The invention was especially designed for use in a band-saw mill having a two-edged saw and organized to cut in both directions of the carriage's travel. For brevity such a mill may be called a "two-way" or "double-acting" band-saw mill. Such a double-acting band-saw mill, as compared with a one-way or single-acting mill, presents certain special problems or difficulties in respect to the supply of the logs, the removal of the cant, and the disposal of the slabs and lumber, which special difficulties have hitherto proven of such a serious nature that, so far as I am aware, no sawmill of that type has been put into successful operation.

My invention has for its especial object to overcome the above-noted difficulties, with a view of securing the success of the double-acting or two-way sawmill. Some of the features of the invention, however, may be capable of use in other forms of sawmills.

To the ends above noted my invention consists of the novel devices and combinations of devices which are hereinafter described, and defined in the claims.

My invention is illustrated in the accompanying drawings, wherein like notations refer to like parts throughout the several views—

Figure 7:
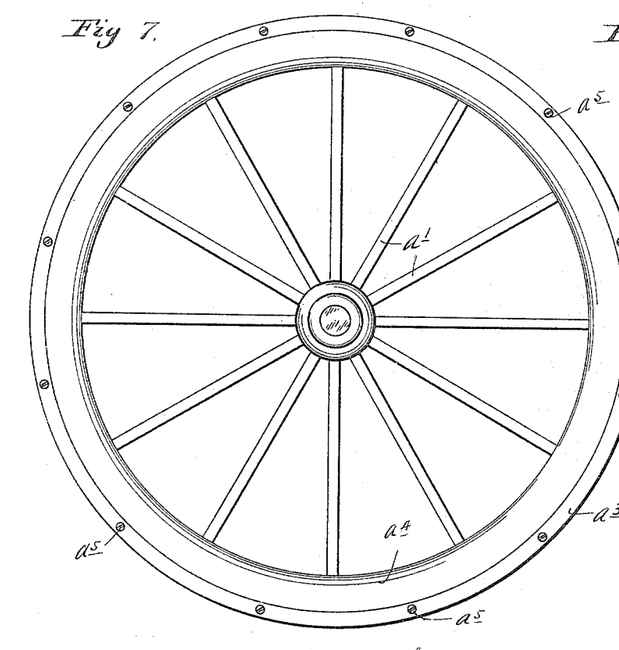
Fig. 7 is a side elevation showing one of the saw-supporting wheels detached.
Figure 8:
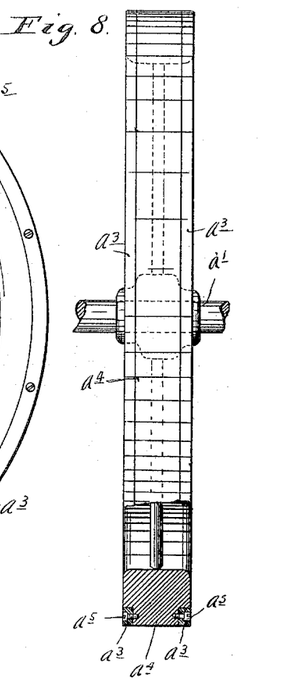
Fig. 8 is an end elevation of the same with some parts broken away.
Figure 9:
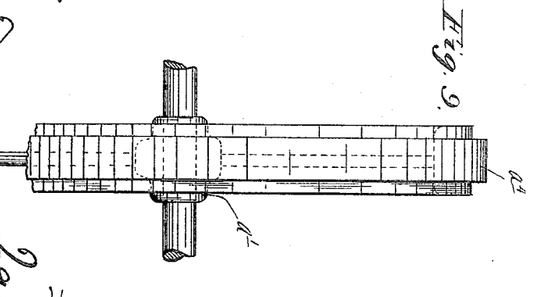
Fig. 9 is a view similar to Fig. 8, but showing the periphery of the wheel as it appears after removal of the marginal sections.
Figure 10:
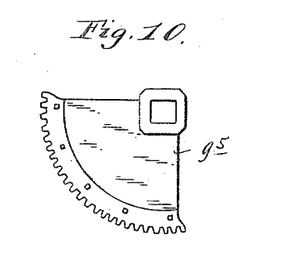
Fig. 10 is a detail in elevation showing sector-gear for the cant-delivery shaft detached.
Figure 11:
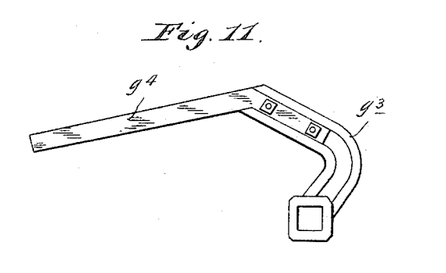
Fig. 11 is a similar view showing one of the cant-delivering arms detached.
Figure 12:
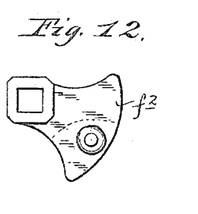
Figs. 12 and 13 are detail views in side and end elevation, respectively, showing one of the cut-off sectors of the log-loader detached.
Figure 13:
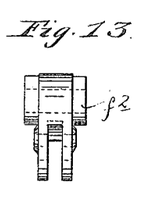
Figure 14:
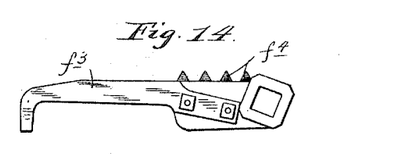
Fig. 14 is a detail in side elevation showing one of the log-loading arms detached.

The two-edged band-saw $a$ is supported and operated by suitable wheels $a'$, which are mounted in respect to each other and the mill-frame $a^2$ in the ordinary or any suitable way. The supporting-wheels $a'$ are of the ordinary construction, with the exception that provision is made for reducing the length of the peripheries thereof in order to compensate for the filing away of the saw. The means shown for this purpose are marginal sections $a^3$, secured to the body portion $a^4$ of the wheel-rim by machine-screws $a^5$ or other suitable means, which will permit the said marginal sections to be removed at will. The construction of the wheel, however, is made the subject-matter of a divisional application filed in my name on the 27th day of April, 1899, Serial No. 714,741, and hence is not claimed herein.

Attention will now be directed to the general features of the mill.

The log-carriage $b$ is of the usual or any suitable form and is mounted to travel on a suitable track $c$, which extends in both directions for the required distance beyond the position of the band-saw for the desired action of the saw in both directions of the carriage's travel.

Figure 4:
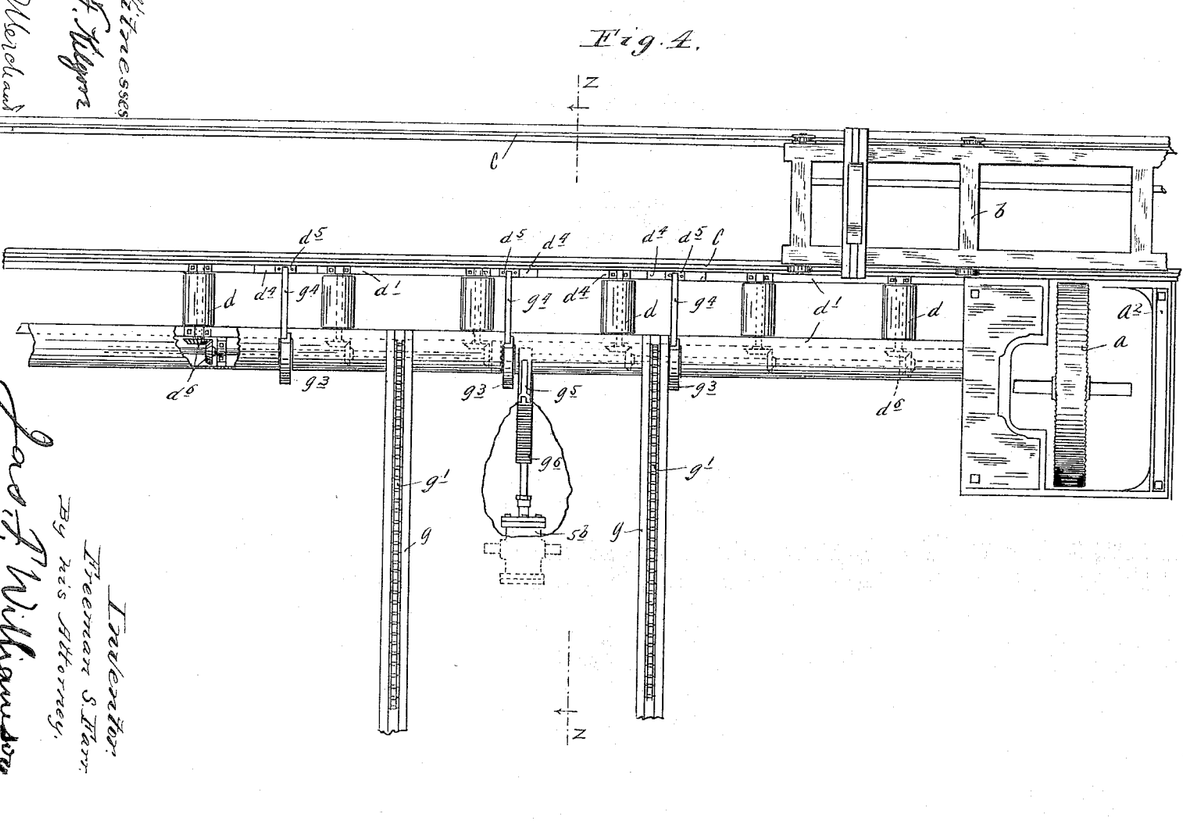
Fig. 4 is a plan view of the opposite or delivery end of the mill with some parts removed and others broken away.

At the receiving end of the mill is located the log-deck $f$, which is of the usual or any suitable construction. At the opposite or delivery end of the mill is located a cant deck or receiver $g$. Between the track $c$ and the said two decks—to wit, said log-deck $f$ and said cant-deck $g$—is located the live-roll way $d$ $d'$, which is of such construction that the upper surfaces of the live-rolls $d$ are below the levels of said decks and the log-carriage. The supporting-framework $d'$ for the live-rolls $d$ has attached to the track side, as shown, suitable abutment or stop blocks $d^3$ $d^4$ for purposes which will presently appear. These abutment or stop blocks $d^3$ $d^4$ are also shown as recessed or rabbeted to afford shouldered surfaces $d^5$ on their inner edges. The live-rolls $d$ are driven in the usual way by beveled-gear driving connections, which are indicated at $d^6$ in Figs. 1 and 4.

Figure 2:
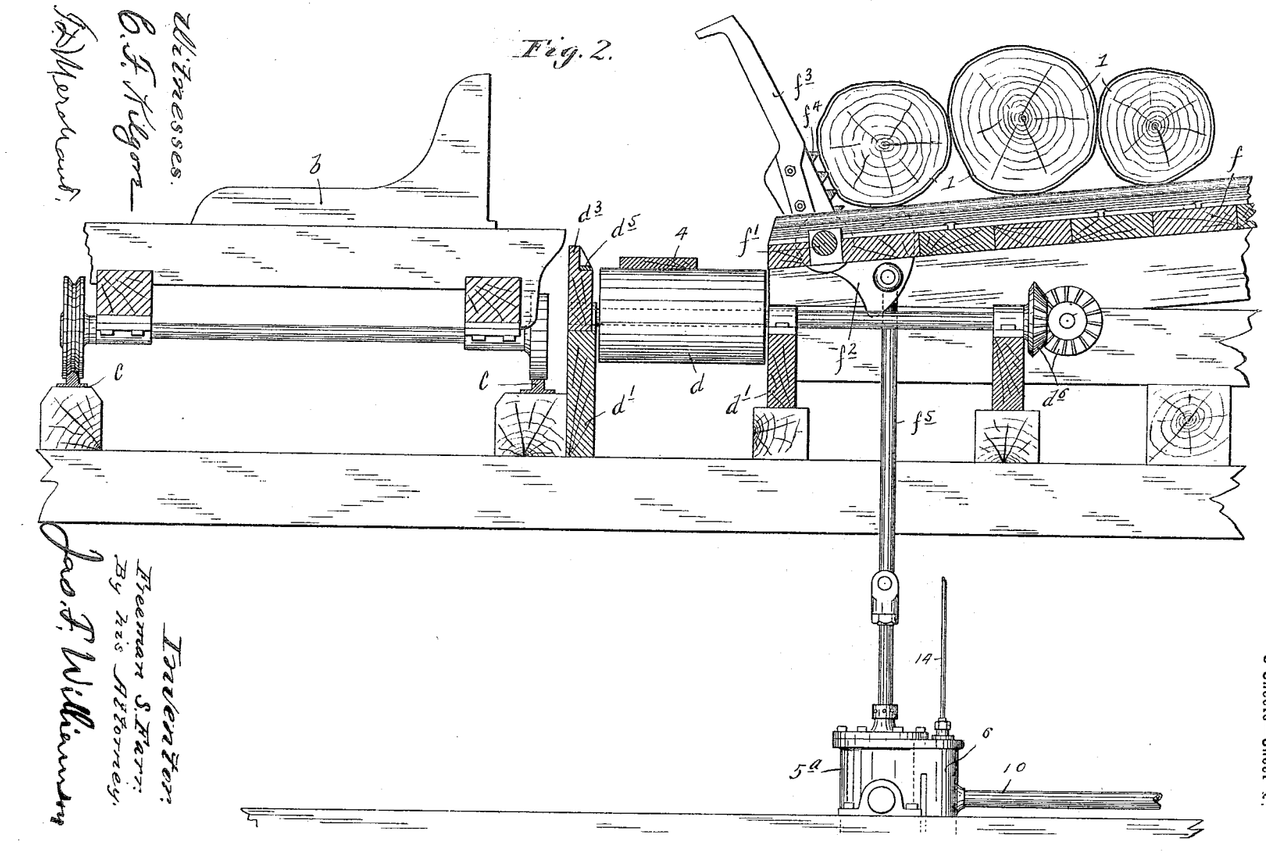
Fig. 2 is a vertical cross-section on the line $x\,x$ of Fig. 1 with the loading-arms in their raised or log-retaining position.
Figure 3:
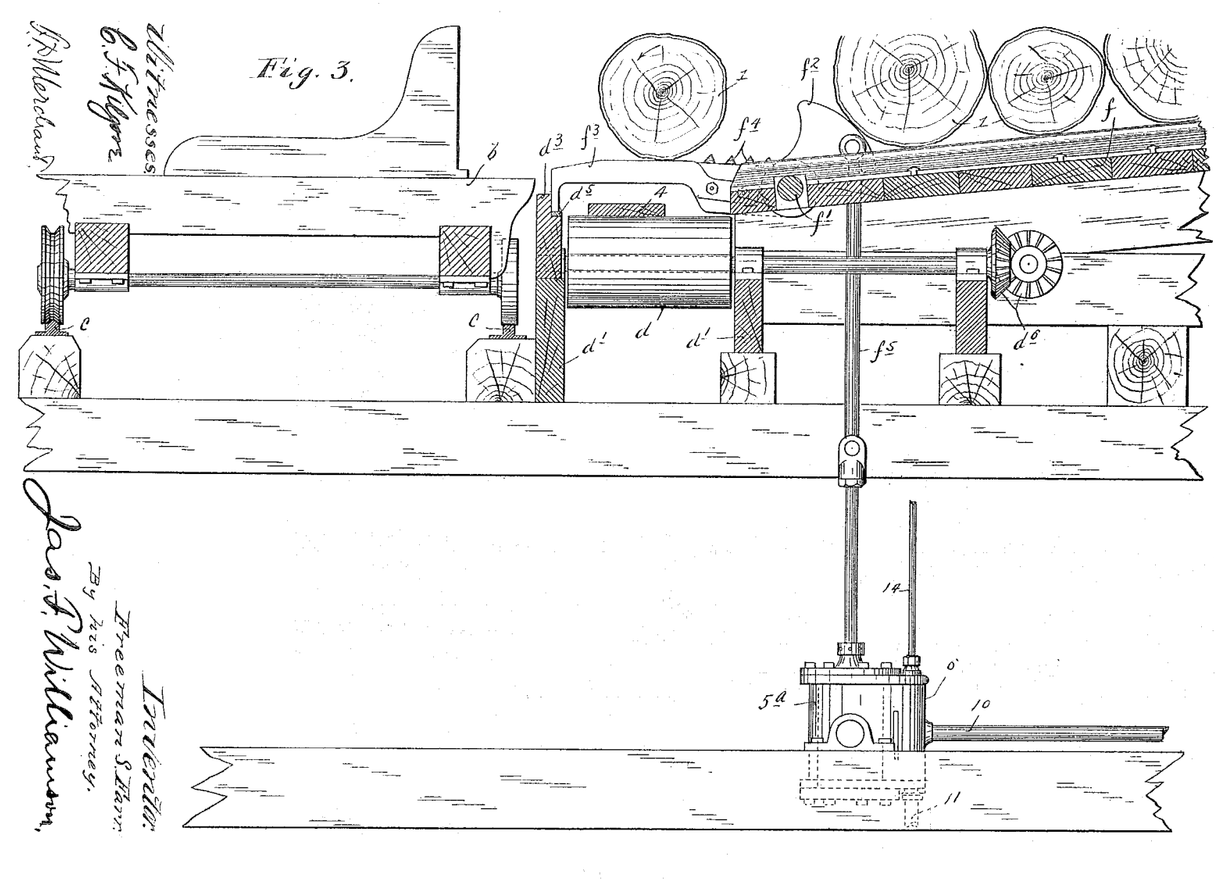
Fig. 3 is a view similar to Fig. 2, but with the loading-arms in their lowered or loading position.

On the log-deck $f$ is mounted in the usual or any suitable way a rock-shaft $f'$. This rock-shaft $f'$ has fixed thereto cut-off sectors $f^2$ of a special form or shape for the most efficient action. Loading-arms (shown as made up in two sections, each marked $f^3$ and $f^4$) are also fixed to said rock-shaft $f'$; but these loading-arms instead of being of the usual form are of a form adapted to overreach the live-rolls $d$ for delivering the logs 1 to the carriage $b$ without interfering with the action of the live-rolls. As shown, the outer sections $f^3$ of the loading-arms are of hook shape at their outer ends, and when the loading-arms are in their lowered or delivering position, as shown in Fig. 3, their outer ends may strike the shoulders $d^5$ of the abutment or stop blocks $d^3$. In virtue of their shape and their relation to the rock-shaft $f'$ when in their lowered position the said loading-arms will deliver the logs over the live-roll way to the carriage while leaving sufficient clearance underneath the arms for the free movement of the lumber on the live-rolls. The outer sections $f^3$ of the loading-arms are shown as removably secured to the inner sections $f^4$. The inner sections $f^4$ are enlarged and toothed on their faces and serve the function of the ordinary retaining-arms for holding the logs in banking position when the log-loader is in the position shown in Fig. 2. Otherwise stated, an ordinary log-loader can be converted into one suitable for delivering the logs over the live-roll way to the carriage, as herein disclosed, by simply adding to the ordinary retaining arms or sections $f^4$ the outer end arms or sections $f^3$. The rock-shaft $f'$ of the log-loader also receives motion from a suitable upright engine or fluid-pressure motor in the ordinary way. As shown, one of the cut-off sectors $f^2$ of the log-loader is connected by a rod $f^5$ to the piston-rod of an upright reciprocating engine $5^a$.

The skid-timbers $g$ of the cant-deck are shown as provided with endless chains $g'$, moving over the same, for conveying the cant 2 to any point desired, such as a gang-saw mill.

Figure 5:
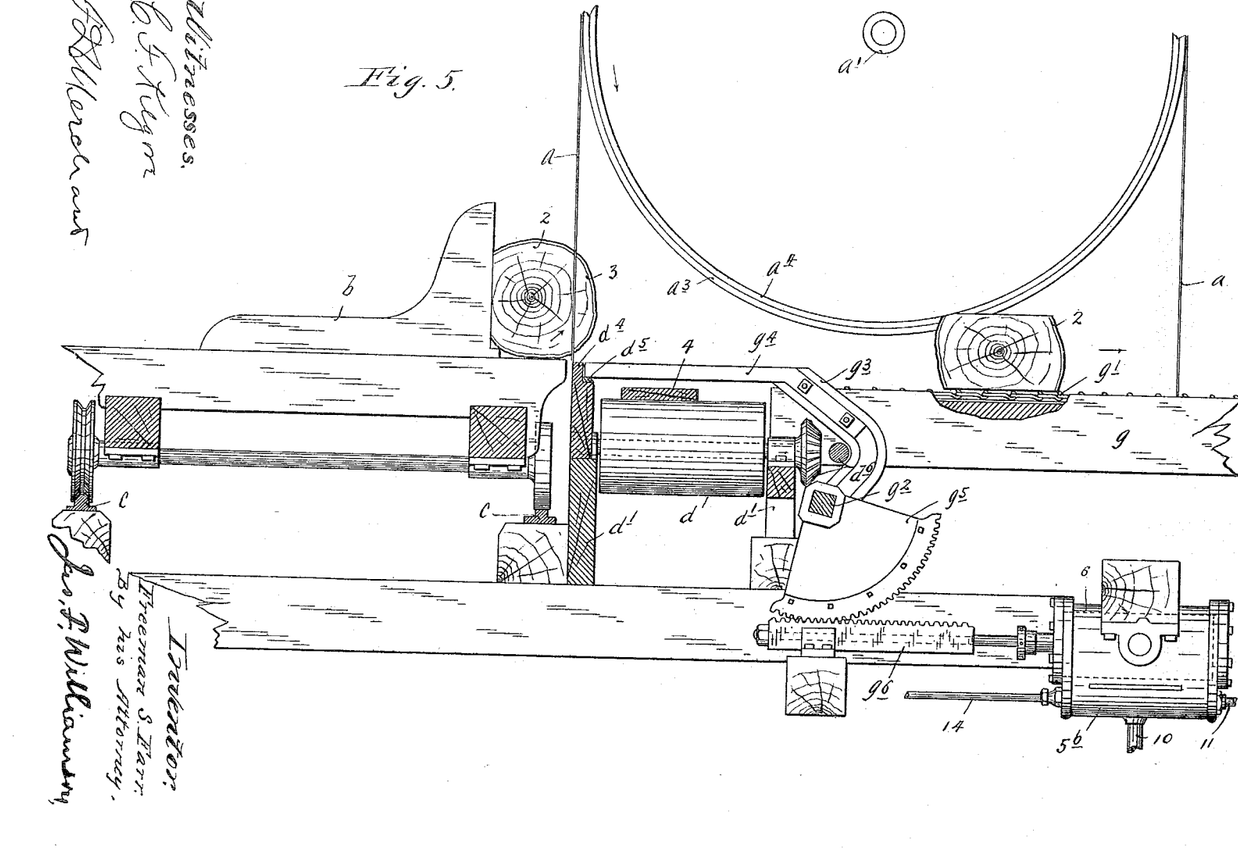
Fig. 5 is a vertical cross-section on the line $z\,z$ of Fig. 4 with the cant-delivering arms in their lowermost or receiving position.
Figure 6:
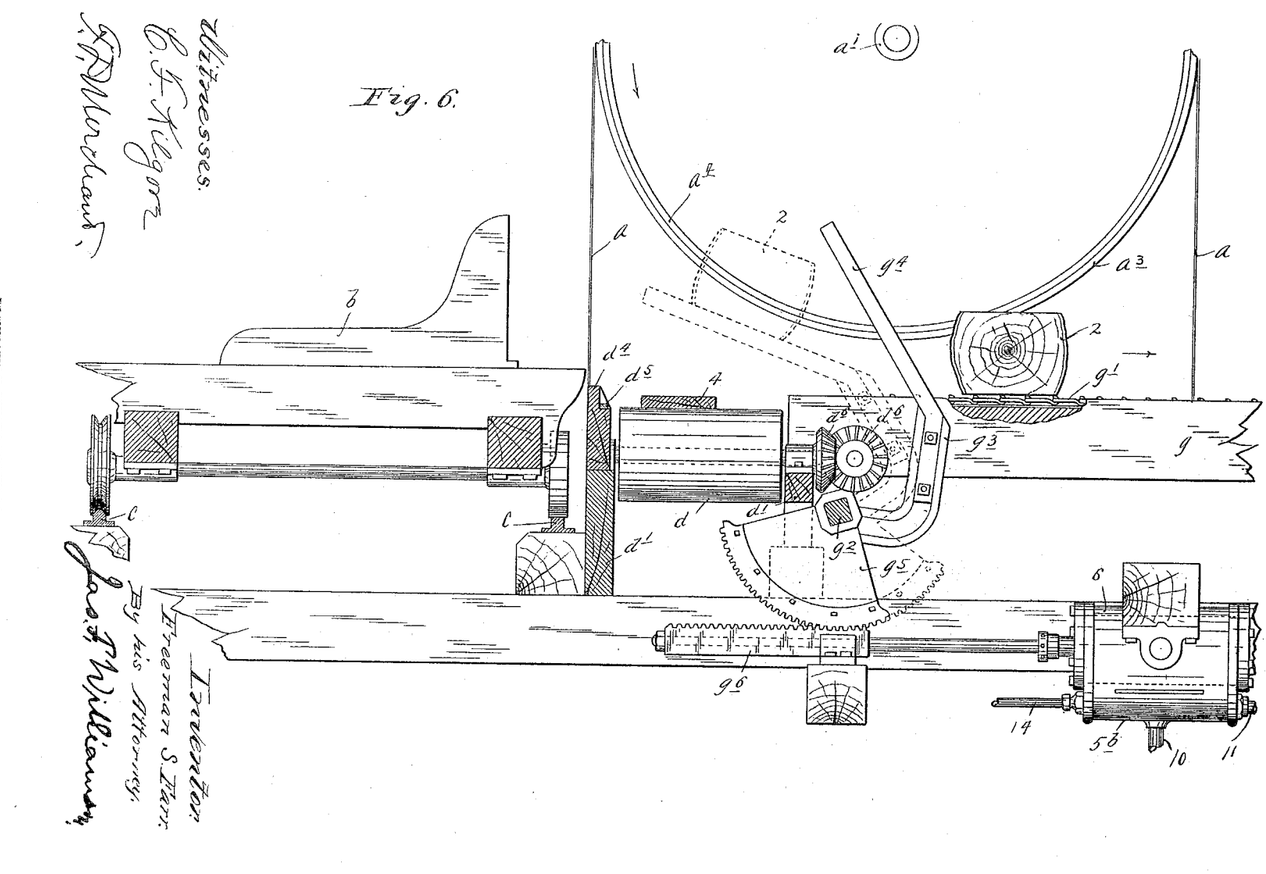
Fig. 6 is a view similar to Fig. 5, but with the cant-delivering arms shown in full lines in their uppermost or normal position and in dotted lines in their delivering position.

Directly under the cant-deck $g$ in suitable bearings is mounted a rock-shaft $g^2$. To this rock-shaft are fixed the cant-delivering arms, which are shown as made up of the two sections $g^3$ and $g^4$, bolted or otherwise rigidly secured together. To the rock-shaft $g^2$ is also fixed a sector-gear $g^5$, which engages with a rack $g^6$, fixed to the piston-rod of a horizontal reciprocating engine $5^b$, as shown in Fig. 5. With these connections it is obvious that a rocking motion may be imparted to the shaft $g^2$ and the cant-delivery arms $g^3$ $g^4$ at will. The said cant-delivery arms $g^3$ $g^4$ are of the proper shape to overreach the live-roll way and rest at their outer ends in the recesses $d^5$ of the abutment or stop blocks $d^4$ when the said arms are in their lowermost or receiving position, as shown in Fig. 5, while at the same time preserving sufficient clearness underneath the said arms for the free movement of the lumber 4 on the live-rolls $d$. At the proper time the cant 2 is forced off from the carriage $b$ onto the cant-delivering arms $g^3$ $g^4$ when in the position shown in Fig. 5, and under the action of the engine $5^b$ the cant 2 will be delivered over the live-roll way onto the chains $g'$ of the deck $g$ by bringing the parts into the position shown in full lines in Fig. 6.

Having regard to the general action, it must be obvious that by the improvements above described the double or two-way action of the mill is rendered entirely feasible without incurring any extraordinary loss either in supplying the logs or in the disposal of the cuts. When the carriage reaches the loading position at the head of the mill, opposite the log-deck $f$, or at some time before its arrival in that position, the slab 3 or the board 4 is forced off from the carriage onto the live-rolls $d$, and the log-loader is then thrown into action. At the opposite limit of the carriage's travel the slab 3 or board 4 is disposed of in a similar manner onto the live-rolls $d$, and the cant-delivering device is then thrown into action, thereby disposing of the cant. With this organization, therefore, there is no occasion for more than the ordinary delay at either end of the carriage's travel. The two-way or double-acting mill is therefore rendered entirely practicable, thereby very greatly increasing the capacity or output as compared with the ordinary one-way band-mill.

Figure 15:
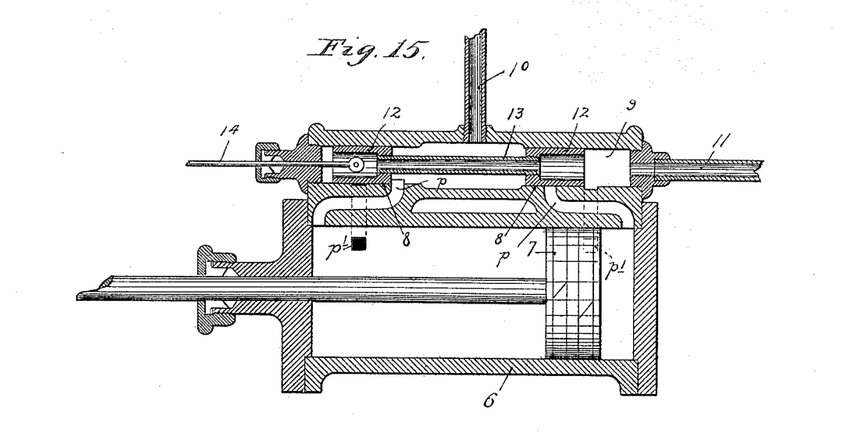
Fig. 15 is a sectional elevation with some parts broken away, illustrating the special form of engine or fluid-pressure motor which is used for operating the loader and the cant-delivering device.

The two engines or fluid-pressure motors $5^a$ and $5^b$ are exactly alike and are of a special form designed by me to meet the requirements of this and other similar work. The construction of these engines is illustrated in Fig. 15. Therein the numeral 6 represents the cylinder; 7, the piston; 8, the valve-seats; 9, the steam-chest; 10, the supply-pipe, and 11 the exhaust-pipe. The valve-sections 12 are hollow and connected by a hollow reduced stem 13. The valve-sections 12 control the admission-ports $p$ and the exhaust-ports $p'$, and they also serve to divide the steam-chest 9 into end or exhaust sections and a central or admission section. The valve-sections 12 and their connecting-stem 13 are made hollow to permit the passage therethrough of the exhaust from that end of the chest and cylinder opposite the single exhaust-pipe 11. By the use of two exhaust-pipes the said valve elements 12 and 13 might be made solid. The exhaust-ports $p'$ tap the cylinder a sufficient distance inward toward the center of the piston's travel to permit the piston $p^7$ to cover the said ports and close off the exhaust before reaching the end of the stroke, as shown in Fig. 15. By this action some of the steam is caged between the piston and the end of the cylinder, and thereby made to act as a cushion to the piston. This of course avoids any jar which might otherwise occur to the parts operated by the engine. The valves are of course controlled by hand. For this purpose they are shown as provided with hand-rods 14. As the valve is practically a balanced valve, it is very easily operated by hand.

Although especially designed for the two-way or double-acting mill herein described, it must be obvious that the log-loader and the cant-delivering device herein described might be employed in any form of mill where it was desirable to secure the corresponding functions of loading the logs over the live-roll way or delivering the cant over the live-roll way. Suppose, for example, that a mill was so designed that the lumber should go out at the same end as the logs are taken in. In such case the log-loader herein disclosed and the cant-delivering device herein disclosed would be needed. Their special purpose, however, and great value are in combination with each other and the other coöperating elements to secure a successful two-way or double-acting band-saw mill.

Figure 1:
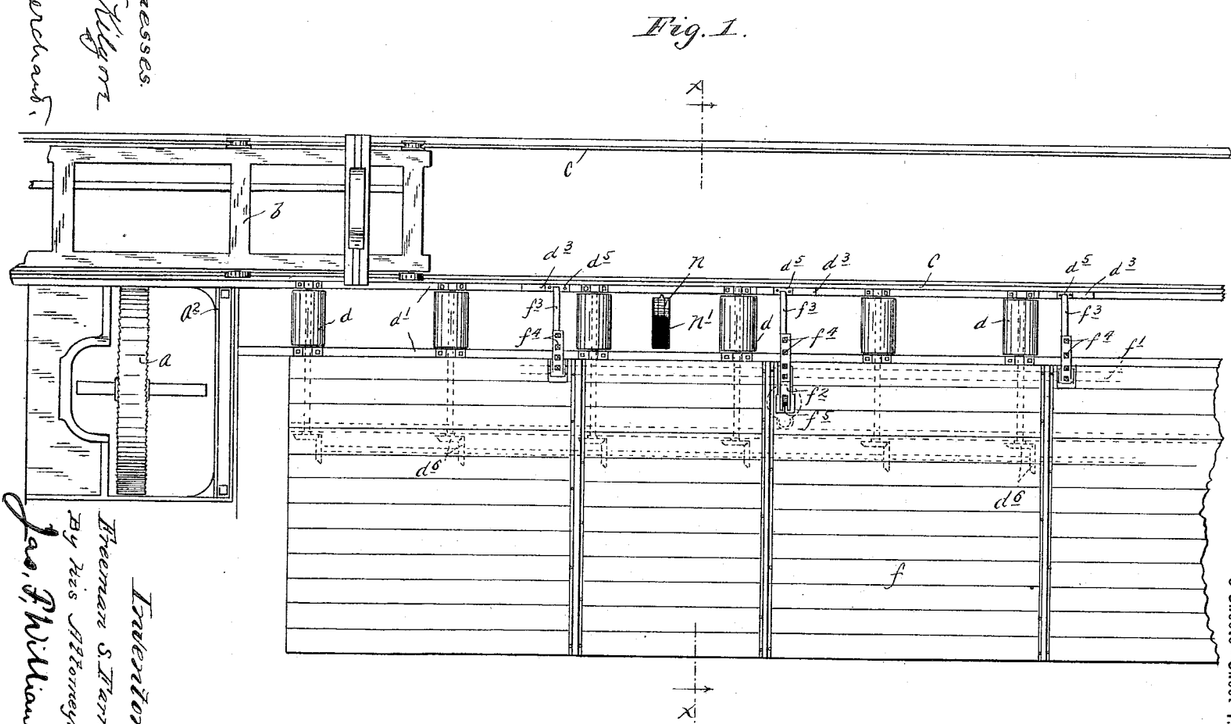
Figure 1 is a plan view of the receiving or log-supplying end of the mill with some parts removed and others broken away.

It should have been noted that with the organization herein disclosed the "nigger" or log-turner will be arranged to operate between the side frames of the live-roll way, the passage for the same being shown at $n'$ in Fig. 1 of the drawings.

The foregoing part of this specification and all of the claims hereto attached had been written and the drawings for the entire case had been completed and blue-prints thereof taken prior to April 9, 1898. Since that date the working full-sized mill organized to include the mechanism herein disclosed has been completed and put into successful operation in a sawmill in Minneapolis, Minnesota, one of the largest mills in the world. It is found in practice that this two-way or double-acting sawmill will saw three boards from corresponding logs while the circular saw saws two boards. The old one-way band-saw mill sawed two boards while the circular saw sawed three boards. The two-way mill is also easier on the machinery and easier on the men. It amounts to a revolution in saw-mill machinery.

The live-roll way $d\ d'$ herein disclosed is, of course, simply one form of lumber-conveyer. Any other form of conveyer capable of disposing of the lumber as cut and delivered from the carriage might, of course, be substituted for the live-roll way as a mechanical equivalent thereof. It will also be understood that other details of the structure disclosed might be changed without departing from the spirit of the invention.

What I claim, and desire to secure by Letters Patent of the United States, is as follows:

1. In a two-way or double-acting band-saw mill, the combination with a carriage and a track, of decks for the logs and the cants on opposite sides of the saw, a lumber-conveyer for disposing of the lumber as cut, a log-loader arranged to deliver the logs from the log-deck to the carriage, without interfering with the action of said lumber-conveyer, and a cant-delivering device arranged to deliver the cant from the carriage to the cant-deck, without interfering with the action of said lumber-conveyer, substantially as described.

2. In a two-way or double-acting band-saw mill, the combination with a carriage and a track, of decks for the logs and the cants on opposite sides of the saw, a live-roll way extending between said track and said decks, a log-loader arranged to deliver the logs from said deck over said rollway to said carriage and a cant-delivering device arranged to deliver the cants from the carriage over said rollway to the cant-deck, all without interfering with the action of the live-rolls, substantially as described.

3. In a sawmill, the combination with a carriage, track and log-deck, of a lumber-conveyer between said track and said deck, and a log-loader arranged to deliver the logs from said deck to said carriage, without interfering with the action of said lumber-conveyer, substantially as described.

4. In a sawmill, the combination with a carriage and a track and a log-deck, of a live-roll way located between said track and said deck, a log-loader arranged to deliver the logs from said deck over said live-rolls to the carriage, without interfering with the action of said rolls, and a power device applied to operate said log-loader, substantially as described.

5. In a sawmill, the combination with the carriage, the track and a log-deck, of a live-roll way between the track and the deck, and a log-loader comprising a rock-shaft with loading-arms adapted to overreach the live-roll way for delivering the logs to the carriage, without interfering with the action of the rolls, substantially as described.

6. In a sawmill, the combination with the carriage, the track and a log-deck, of a live-roll way between the track and the deck, a log-loader comprising a rock-shaft with loading-arms adapted to overreach the live-roll way, and abutments or stop-blocks on the track side of said roll way, against which said arms rest when in their lowermost or loading position, substantially as described.

7. In a sawmill, the combination with a carriage, the track and log-deck, of a live-roll way between said track and deck and a log-loader comprising a rock-shaft having the ordinary cut-off sectors $f^2$ and retaining-arm sections $f^4$, and provided also with loading-arms $f^3$ adapted to overreach the live-roll way, abutments $d^3$ fixed to the track side of the rollway, and a hand-controlled engine applied to operate said log-loader, substantially as described.

8. In a sawmill, the combination with a carriage, track and a cant-deck, of a lumber-conveyer located between said track and said deck, and a cant-delivering device arranged to deliver the cant from said carriage to said deck, without interfering with the action of said lumber-conveyer, substantially as described.

9. In a sawmill, the combination with a carriage, track and cant-deck, of a live-roll way between said track and deck, and a cant-delivering device comprising a rock-shaft having a series of arms adapted to overreach the live-roll way, without interfering with the action of the same, and a power device applied to operate said rock-shaft, substantially as described.

10. In a sawmill, the combination with a carriage, track and cant-deck, of a live-roll way between said track and said deck, and a cant-delivering device comprising a rock-shaft $g^2$, a series of delivering-arms $g^3$ $g^4$ fixed to said shaft adapted to overreach the live-roll way, abutment-blocks $d^4$ fixed to the track side of said rollway, against which said arms rest when in receiving position, a sector $g^5$ fixed to said shaft, and an engine having a rack $g^6$ on its piston-rod, engaging with said sector, all substantially as and for the purpose set forth.

In testimony whereof I affix my signature in presence of two witnesses.

FREEMAN S. FARR.

Witnesses:
JAS. F. WILLIAMSON,
BESSIE B. NELSON.